United States Patent
Matsuda et al.

(10) Patent No.: US 11,601,328 B2
(45) Date of Patent: Mar. 7, 2023

(54) COMMUNICATION PATH CONTROL DEVICE, COMMUNICATION PATH CONTROL METHOD, AND COMMUNICATION PATH CONTROL SYSTEM

(71) Applicant: SONY CORPORATION, Tokyo (JP)

(72) Inventors: Hiroki Matsuda, Tokyo (JP); Takashi Kito, Tokyo (JP); Kazuo Hongo, Tokyo (JP); Ryota Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,401

(22) PCT Filed: Jul. 24, 2019

(86) PCT No.: PCT/JP2019/029081
§ 371 (c)(1),
(2) Date: Jan. 18, 2021

(87) PCT Pub. No.: WO2020/022397
PCT Pub. Date: Jan. 30, 2020

(65) Prior Publication Data
US 2021/0273847 A1 Sep. 2, 2021

(30) Foreign Application Priority Data
Jul. 26, 2018 (JP) .............................. JP2018-140136

(51) Int. Cl.
*H04L 41/0654* (2022.01)
*H04L 47/2425* (2022.01)
(Continued)

(52) U.S. Cl.
CPC ...... *H04L 41/0654* (2013.01); *H04L 47/2433* (2013.01); *H04W 24/04* (2013.01); *H04W 40/02* (2013.01)

(58) Field of Classification Search
None
See application file for complete search history.

(56) References Cited

U.S. PATENT DOCUMENTS 8,050,289 B1 * 11/2011 Masterson ......... H04N 21/2402
370/465
2002/0093954 A1 * 7/2002 Weil ....................... H04L 45/50
370/389
(Continued)

FOREIGN PATENT DOCUMENTS

EP 1562390 A1 * 8/2005 ............ H04W 88/06
EP 1657608 A1 5/2006
(Continued)

OTHER PUBLICATIONS

International Search Report and Written Opinion of PCT Application No. PCT/JP2019/029081, dated Sep. 10, 2019, 09 pages of ISRWO.
Fujiwara, et al., "Augmenting Low-latency HPC Network with Free-space Optical Links", 2015 IEEE 21st International Symposium on High Performance Computer Architecture (HPCA), Feb. 7-11, 2015, 11 pages.
(Continued)

*Primary Examiner* — Anh Ngoc M Nguyen
(74) *Attorney, Agent, or Firm* — Chip Law Group

(57) ABSTRACT

Provided is a communication path control device that transmits path information for controlling a path for transmitting data to a plurality of communication devices which are connected by a wired path and through which data addressed to the plurality of communication devices is sequentially forwarded.

15 Claims, 13 Drawing Sheets

(51) Int. Cl.
*H04W 24/04* (2009.01)
*H04W 40/02* (2009.01)

(56) References Cited

U.S. PATENT DOCUMENTS

| | | | |
|---|---|---|---|
| 2003/0191856 A1* | 10/2003 | Lewis | H04W 28/0231 370/328 |
| 2006/0136604 A1 | 6/2006 | Schultze et al. | |
| 2007/0097865 A1* | 5/2007 | Song | H04J 3/247 370/235 |
| 2007/0230494 A1* | 10/2007 | Nakayama | H04L 12/6418 370/412 |
| 2015/0381473 A1* | 12/2015 | Murakami | H04L 45/22 370/351 |
| 2017/0308412 A1* | 10/2017 | Prakash | G06F 9/4881 |

FOREIGN PATENT DOCUMENTS

| | | |
|---|---|---|
| JP | 2006-109258 A | 4/2006 |
| JP | 2006-148911 A | 6/2006 |
| JP | 2006-197304 A | 7/2006 |
| JP | 2009-296293 A | 12/2009 |
| JP | 2011-119999 A | 6/2011 |
| JP | 2012-209789 A | 10/2012 |
| JP | 2018-032902 A | 3/2018 |

OTHER PUBLICATIONS

Ozaki, et al., "Design technique of power-saving network using an optical wireless link and on/off control", Proceedings D of IEICE, vol. J98-D, No. 6, Jun. 1, 2015, pp. 1005-1018.

* cited by examiner

COMMUNICATION PATH CONTROL DEVICE, COMMUNICATION PATH CONTROL METHOD, AND COMMUNICATION PATH CONTROL SYSTEM

CROSS REFERENCE TO RELATED APPLICATIONS

This application is a U.S. National Phase of International Patent Application No. PCT/JP2019/029081 filed on Jul. 24, 2019, which claims priority benefit of Japanese Patent Application No. JP 2018-140136 filed in the Japan Patent Office on Jul. 26, 2018. Each of the above-referenced applications is hereby incorporated herein by reference in its entirety.

TECHNICAL FIELD

The present disclosure relates to a communication path control device, a communication path control method, and a communication path control system.

BACKGROUND ART

In the related art, for example, PTL 1 below describes a technology that assumes improvement in communication efficiency by preventing a decrease in transmission speed as much as possible when communication quality has deteriorated.

CITATION LIST

Patent Literature

[PTL 1]
JP 2006-197304A

SUMMARY

Technical Problem

However, while assuming improvement in the reliability of transmission quality between two communication devices, the technology described in Patent Literature listed above does not assume problems such as an increase in delay time or no communication being possible in some communication devices due to a problem in a communication path.

Therefore, it is required that communication be performed through an optimal path in a system in which data addressed to a plurality of communication devices connected by a wired path is sequentially forwarded.

Solution to Problem

The present disclosure provides a communication path control device configured to transmit path information for controlling a path for transmitting data to a plurality of communication devices which are connected by a wired path and through which data addressed to the plurality of communication devices is sequentially forwarded.

The present disclosure provides a communication path control method including transmitting path information for controlling a path for transmitting data to a plurality of communication devices which are connected by a wired path and through which data addressed to the plurality of communication devices is sequentially forwarded.

The present disclosure provides a communication path control system including a plurality of communication devices which are connected by a wired path and through which data is sequentially forwarded and a communication path control device configured to transmit path information for controlling a path for transmitting the data to the communication devices.

Advantageous Effects of Invention

According to the present disclosure, it is possible to perform communication through an optimal path when a problem has occurred in a communication path as described above.

The above advantage is not necessarily limitative and any advantages shown in the present specification or other advantages that can be construed from the present specification can be achieved together with or instead of the above advantage.

DESCRIPTION OF EMBODIMENTS

Figure 1:
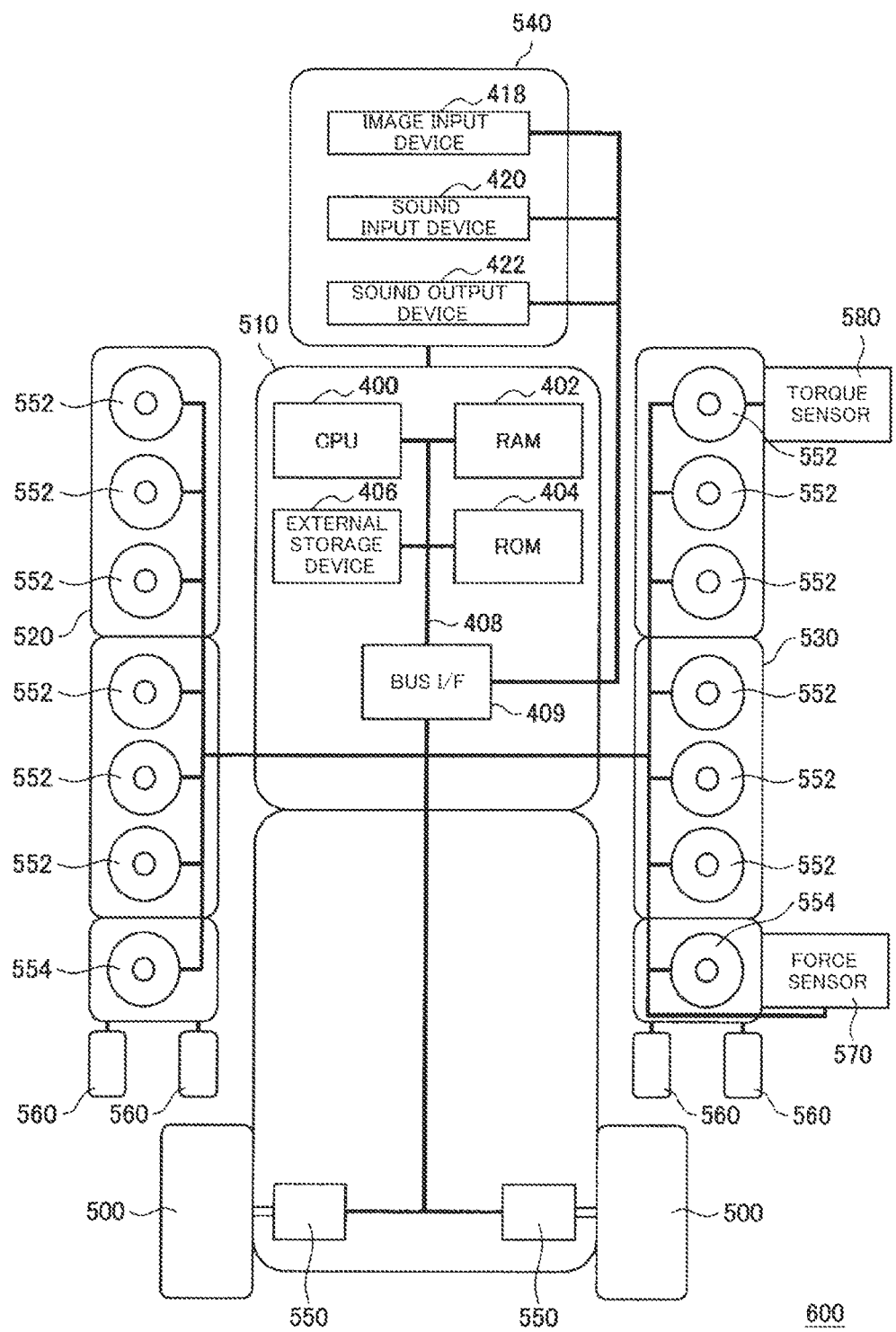
FIG. 1 is a schematic diagram showing a schematic hardware configuration of a robot to which a system according to an embodiment of the present disclosure is applied.

Preferred embodiments of the present disclosure will be described in detail with reference to the accompanying drawings below. In the present specification and the drawings, components having substantially the same functional configuration are denoted by the same reference signs to omit duplicate description.

The description will be given in the following order.
0. Background
1. Exemplary configuration of robot
2. Prerequisite system
3. Embodiments of present disclosure
3.1. Example in which communication path control device is included as part of master
3.2. Example of master and slaves each including wireless communication unit
3.3. Specific example of communication path selection
3.3.1. Communication path selection in case of malfunction
3.3.2. Communication path selection according to presence or absence of data addressed to slave
3.3.3. Example of selecting communication path according to type of information
3.3.4. Example of selecting path with small amount of delay
3.3.5. Example of selection according to communication directions in which wired communication/wireless communication is possible
3.3.6. Example of selecting path limited to terminal that requires communication
3.3.7. Example of notifying communication path control device of information relating to communication unit
3.3.8. Example of notifying of time information such as transmission and reception times
3.3.9. Control according to state of wireless communication path
3.3.10. When wireless communication unit malfunctions
3.3.11. Example of sequence according to present embodiment 0. Background Wireless access schemes and wireless networks for cellular mobile communication (hereinafter referred to as "long term evolution (LTE)", "LTE-advanced (LTE-A)", "LTE-advanced pro (LTE-A Pro)", "new radio (NR)", "new radio access technology (NRAT)", "evolved universal terrestrial radio access (EUTRA)", or "further EUTRA (FEUTRA)") have been discussed in the 3rd generation partnership project (3GPP). In the following description, LTE includes LTE-A, LTE-A Pro, and EUTRA and NR includes NRAT and FEUTRA. In LTE, a base station device (a base station) is also referred to as an evolved NodeB (eNodeB). In NR, a base station device (a base station) is also referred to as a gNodeB. In LTE and NR, a terminal device (a mobile station, a mobile station device, or a terminal) is also referred to as user equipment (UE). LTE and NR are cellular communication systems in which a plurality of areas covered by a base station device are arranged in cells. One base station device may manage a plurality of cells.

NR is a radio access technology (RAT) different from LTE, as a next-generation radio access scheme for LTE. NR is an access technology that can handle a variety of use cases including enhanced mobile broadband (eMBB), massive machine type communications (mMTC), and ultra reliable and low latency communications (URLLC). NR is being discussed aiming at a technical framework that handles usage scenarios, requirements, deployment scenarios, and the like in such use cases.

A use with a robot is assumed as a use case of NR. Control using wired communication is commonplace in robot control. In the case of control using wired communication, problems such as no communication being possible, for example, due to disconnection of wired communication, and thus control being disabled may occur. In the case of control using wired communication, problems such as an increase in delay time or limitation of control may also occur because communication paths are limited. Similar problems may occur in use cases other than robots where control is performed using wired communication. In the present embodiment, wired communication and wireless communication such as NR are used in combination as means for solving these problems. Performing control using wireless communication in addition to wired communication improves the flexibility of communication paths, solves the problems described above, and enables efficient control in addition to solving these problems.

1. Exemplary Configuration of Robot

First, a schematic hardware configuration of a robot 600 to which a system according to an embodiment of the present disclosure is applied will be described with reference to FIG. 1. As shown in FIG. 1, the robot 600 is configured to include wheels 500 for movement, a body portion 510, arms 520 and 530, and a head 540.

The wheels 500 are driven by actuators 550. When the wheels 500 are driven, the robot 600 moves. The arms 520 and 530 have multiple joints which are provided with actuators 552. The arms 520 and 530 are bent by driving the actuators 552. The joints of the arms 520 and 530 are provided with encoders that detect the angles of the joints. Similarly, an encoder for detecting the rotation angle of the wheels 500 is provided in the vicinity of the wheels 500.

A hand 560 is provided at the tip of each of the arms 520 and 530. The hand 560 is driven by driving an actuator 554 and exerts a force such as that for gripping an object and pressing an object.

A force sensor 570 is provided at the tip of the hand 560 to detect a gripping force when the hand 560 grips an object and a pressure when the hand 560 presses an object. A torque sensor 580 is provided in each joint to detect a torque at the joint. The force sensor 570 may also be provided at each of the two hands 560.

The body portion 510 is provided with a CPU 400, a RAM 402, a ROM 404, an external storage device 406, a bus 408, and a bus interface (bus I/F) 409. The external storage device 406 is a storage device connected from outside the robot 600. The CPU 400, the RAM 402, the ROM 404, the external storage device 406, and the bus I/F 409 are connected via the bus 408.

The head 540 is provided with an image input device 418, a sound input device 420, and a sound output device 422. These devices are also connected to the CPU 400 and the like of the body portion 510 via the bus I/F 409. In an example, the image input device 418 is formed of a camera, the sound input device 420 is formed of a microphone, and the sound output device 422 is formed of a speaker.

2. Prerequisite System

The present embodiment will be described with reference to a system in which data is transmitted in series between a plurality of slaves as an example, but the present disclosure is a technology that is applicable to an apparatus having a plurality of communication paths, regardless of this example.

A master (a first communication device) that transmits data to a plurality of slaves and one or the plurality of slaves (second communication devices) that receive data transmitted from the master are present in the system. In an example, the master and the plurality of slaves are provided corresponding to the CPU 400 of the robot 600 and the actuators 552 of the arms 520 and 530 in FIG. 1.

Figure 2:
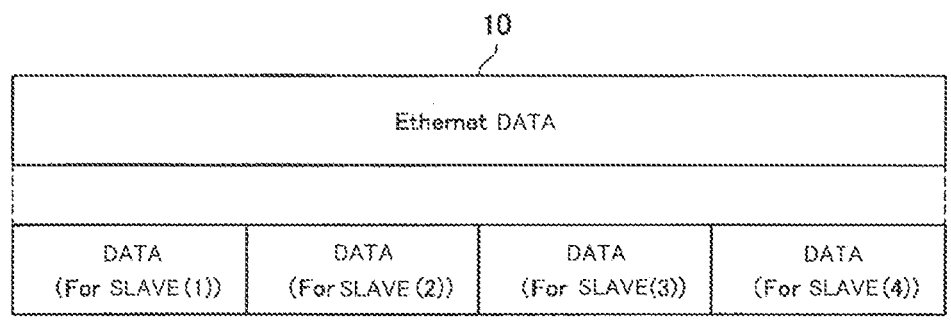
FIG. 2 is a schematic diagram showing an example of data transmitted from a master.

FIG. 2 is a schematic diagram showing an example of data 10 transmitted from a master. FIG. 2 shows an example in which Ethernet (registered trademark) data includes data addressed to four slaves (1) to (4).

As shown in FIG. 2, the data 10 includes pieces of data addressed to a plurality of slaves (1) to (4), and addresses where the pieces of data are present are individually determined for the slaves (1) to (4). For example, the slave (1) receives an address where data addressed to the slave (1) in the data 10 is arranged and transmits, if there is data to be transmitted, the data using the same address.

Figure 3:
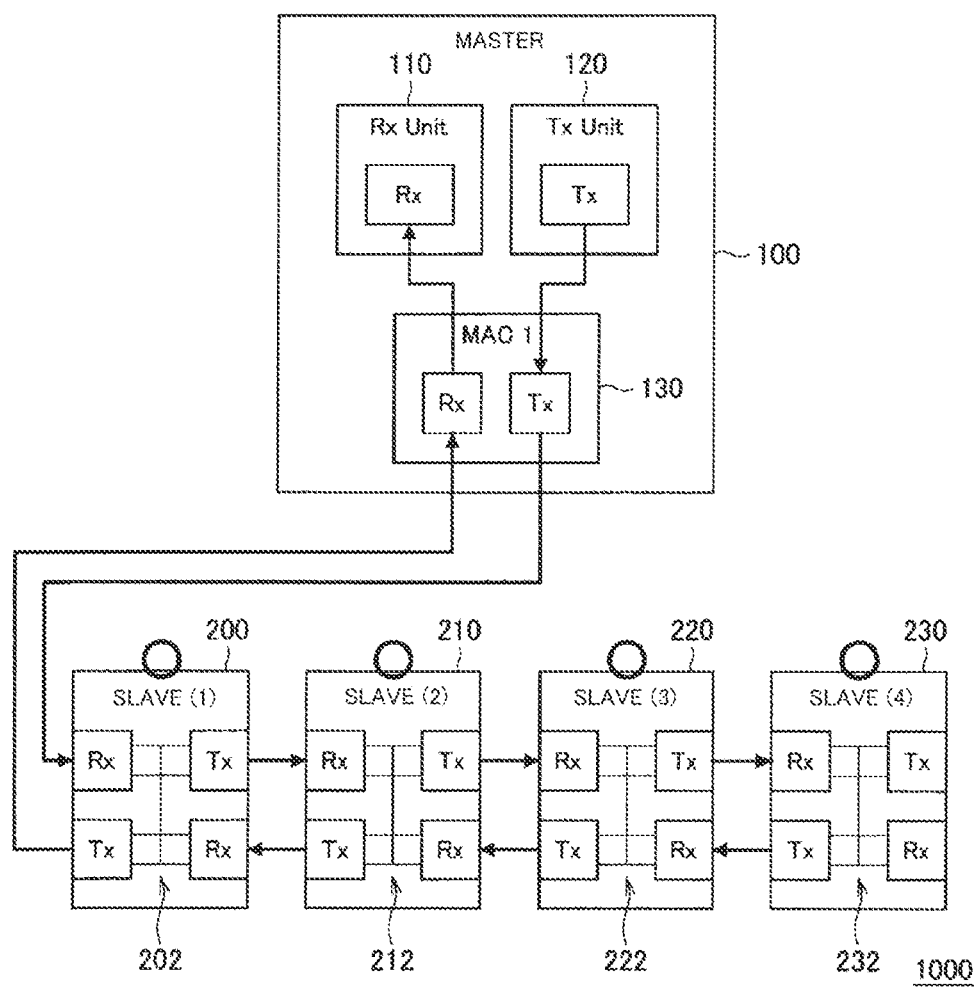
FIG. 3 is a schematic diagram showing an example of a communication path.

The data 10 is transmitted to each slave through a predetermined communication path. FIG. 3 is a schematic diagram showing an example of a communication path. A system 1000 shown in FIG. 3 is configured to include one master 100 and four slaves 200, 210, 220, and 230, and the master 100 includes a receiving unit (Rx Unit) 110, a transmitting unit (Tx Unit) 120, and a media access control (MAC) 130. The receiving unit 110, the transmitting unit 120, and the MAC 130 constitute a communication unit of the master 100.

Each of the slaves 200, 210, 220, and 230 includes interfaces of transmitting units (Tx) and receiving units (Rx). The transmitting units (Tx) and receiving units (Rx) may be of the same or different interfaces. In the slaves 200, 210, 220, and 230, the transmitting units (Tx) and the receiving units (Rx) constitute communication units 202, 212, 222, and 232.

In FIG. 3, a flow of data 10 is indicated by an arrow. The data 10 transmitted from the master 100 passes through the slave (1) 200, the slave (2) 210, the slave (3) 220, and the slave (4) 230, turns around at the slave (4) 230, and then returns to the slave (3) 220, the slave (2) 210, the slave (1) 200, and the master 100. Forwarding the data 10 through such a communication path allows the master 100 and the slaves 200, 210, 220, and 230 to perform data communication.

The slaves 200, 210, 220, and 230 are provided corresponding to the joints of the robot 600. Because the slaves 200, 210, 220, and 230 are provided corresponding to the joints of the robot 600, control signals can be sent to the actuators 552 of the joints by forwarding data 10 to the actuators 552. Values of encoders of the joints and values of the torque sensors 580 can also be forwarded to the master 100.

Figure 4:
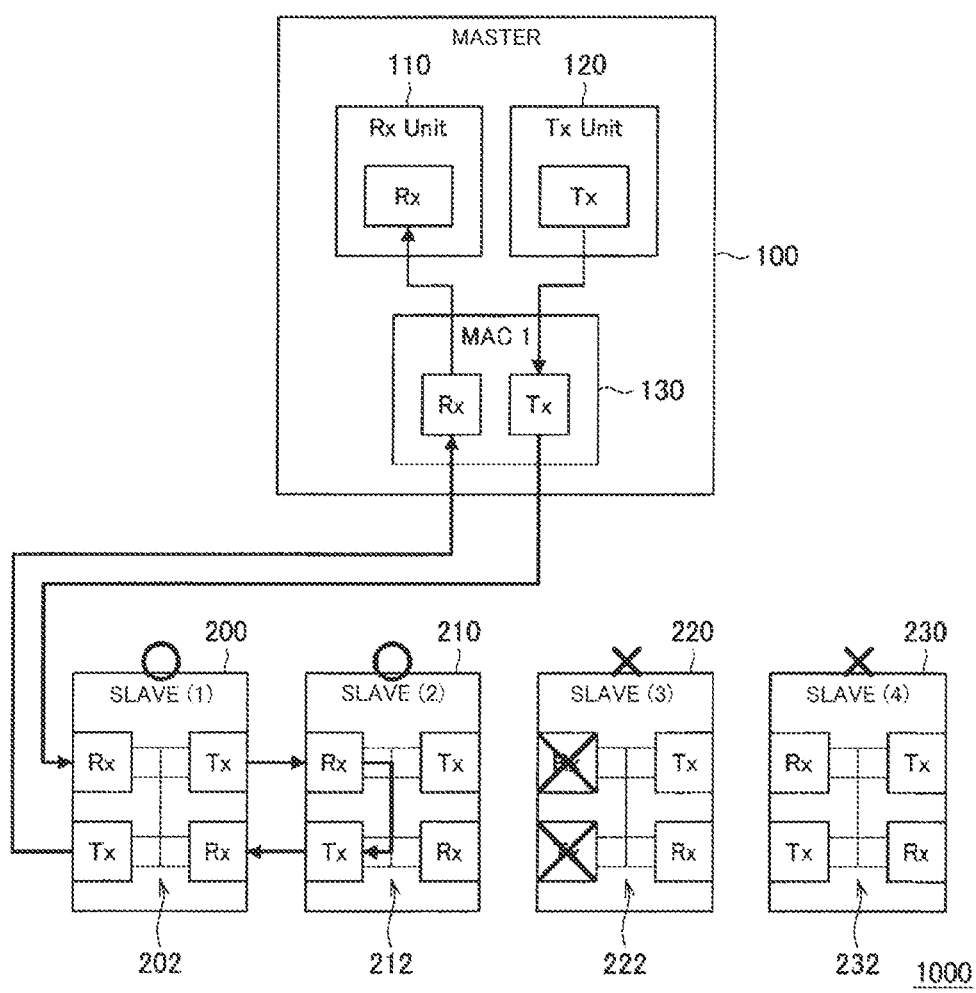
FIG. 4 is a schematic diagram showing a case where a communication unit of a slave (3) is inoperable.

FIG. 3 shows a case where the slaves 200, 210, 220, and 230 are operating normally. On the other hand, FIG. 4 is a schematic view showing a case where the communication unit 222 of the slave (3) 220 is inoperable in the system 1000 of FIG. 3. In each figure, a circle indicates that the slave is normal and a cross indicates that it is inoperable. In the case of FIG. 4, the slave (3) 220 cannot transmit and receive data 10 because the slave (3) 220 cannot communicate with the slave (2) 210. Therefore, the slave (4) 230 cannot transmit and receive data 10 and only the slave (1) 200 and the slave (2) 210 can transmit and receive data 10.

3. Embodiments of Present Disclosure

Figure 5:
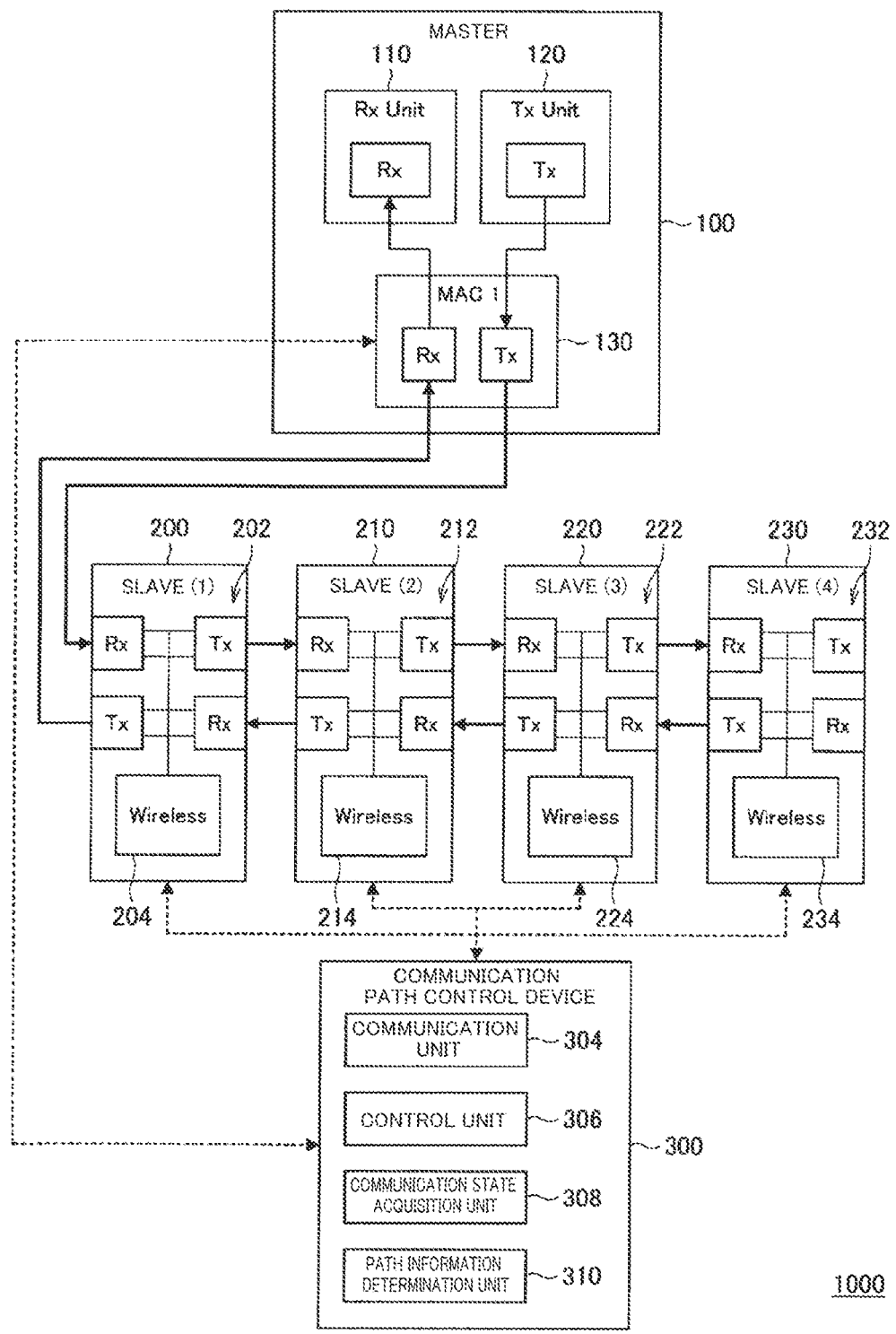
FIG. 5 is a schematic diagram showing a system according to an embodiment of the present disclosure.

FIG. 5 is a schematic view showing a system 1000 according to an embodiment of the present disclosure. This system 1000 is configured to include a communication path control device 300 (a third communication device) in addition to a master 100 (a first communication device) and slaves 200, 210, 220, and 230 (second communication devices).

As shown in FIG. 5, the slaves 200, 210, 220, and 230 include wireless communication units 204, 214, 224, and 234. The slaves 200, 210, 220, and 230 can communicate with each other via the wireless communication units 204, 214, 224, and 234.

The communication path control device 300 includes a communication unit 304 that communicates with either or both of the master 100 or the slaves 200, 210, 220, and 230. The communication path control device 300 monitors the states of the master 100 and the slaves 200, 210, 220, and 230 and controls communication paths.

The number of slaves 200, 210, 220, and 230 is not limited to that of the example of FIG. 5. The slaves 200, 210, 220, and 230 do not all need to include a wireless communication unit.

Provision of the communication path control device 300 enables control of communication paths between the master 100 and the slaves 200, 210, 220, and 230. The communication path control device 300 controls the communication units 202, 212, 222, and 232 of the slaves 200, 210, 220, and 230 by communicating with the slaves 200, 210, 220, and 230. The communication path control device 300 controls wired communication paths and wireless communication paths between the slaves 200, 210, 220, and 230. For this purpose, the communication path control device 300 includes a control unit 306 that controls communication paths between the master 100 and the slaves 200, 210, 220, and 230. The communication path control device 300 includes a communication state acquisition unit 308 and a path information determination unit 310 in addition to the communication unit 304 and the control unit 306 as shown in FIG. 5. The components of the communication path control device 300 shown in FIG. 5 can each be formed of a circuit (hardware) or a central processing unit such as a CPU and a program (software) for causing the central processing unit to function. The communication path control device 300 may be configured to perform either wired communication or wireless communication in the same path and provided with only one of the wired communication unit and the wireless communication unit.

Figure 6:
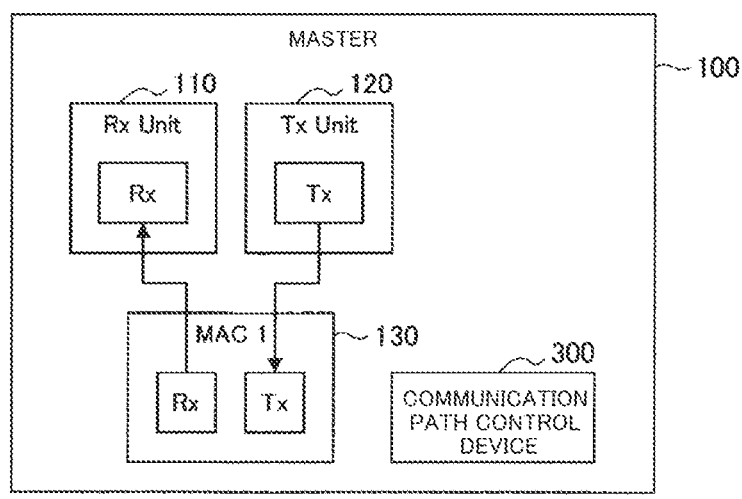
FIG. 6 is a schematic diagram showing an example in which a communication path control device is present as a part of a communication device of a master.

3.1. Example in which Communication Path Control Device is Included as Part of Master The communication path control device 300 may be provided as a communication device which is a part of the master 100. FIG. 6 is a schematic diagram showing an example in which the communication path control device 300 is provided as a communication device which is a part of the master 100. In the example shown in FIG. 6, the communication path control device 300 is included in the master 100 as a functional module of the master 100.

3.2. Example of Master and Slaves Each Including Wireless Communication Unit

Figure 7:
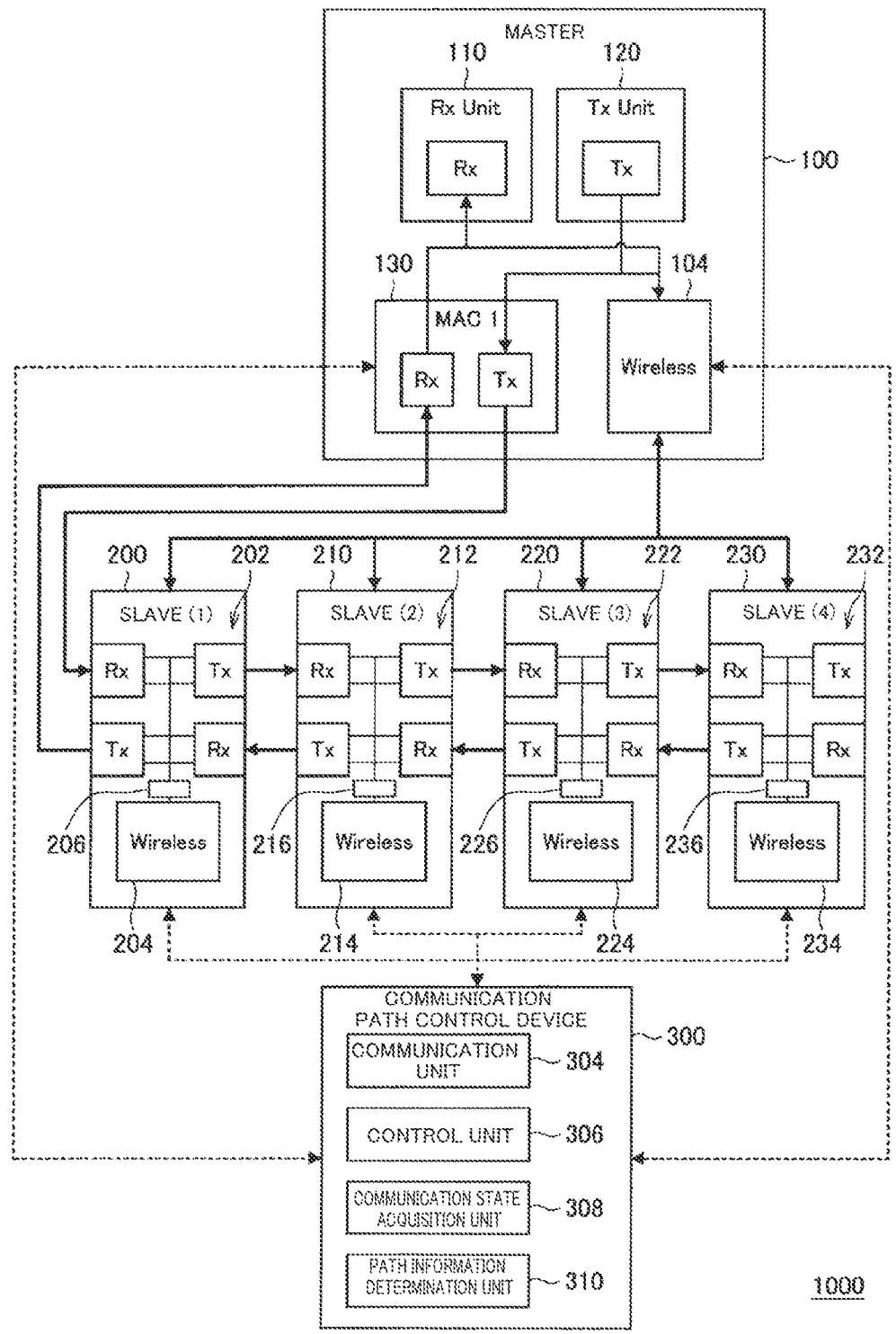
FIG. 7 is a schematic diagram showing an example in which a master includes a wireless communication unit and a slave includes a wireless communication unit.

FIG. 7 is a schematic diagram showing an example in which a master 100 includes a wireless communication unit 104 and slaves 200, 210, 220, and 230 include wireless communication units 204, 214, 224, and 234. Each wireless communication unit may be able to communicate with all other wireless communication units or may be able to communicate only with a specific wireless communication unit. Communication between the wireless communication units may be one-to-one communication between specific devices or one-to-many communication.

When the master 100 includes the wireless communication unit 104, the communication path control device 300 also controls wireless communication paths between the master 100 and the slaves 200, 210, 220, and 230. The control unit 306 controls communication paths between the master 100 and the slaves 200, 210, 220, and 230. The communication path control device 300 may be configured to perform either wired communication or wireless communication in the same path and provided with only one of the wired communication unit and the wireless communication unit.

Communication between the master 100 and the slaves 200, 210, 220, and 230 and the communication path control device 300 may be either wired or wireless although FIG. 7 shows an example in which communication between the master 100 and the slaves 200, 210, 220, and 230 and the communication path control device 300 is performed wirelessly.

Control of communication paths by the communication path control device 300 can realize low delay, high reliability, low power consumption, and the like. Specifically, it is possible to perform communication through the shortest path by allowing only a device (slave) that requires communication to perform communication when transmitting data 10. It is also possible to reduce communication errors and the number of steps of processing communication errors by avoiding an unexpected situation where no communication is possible in advance. This can realize low delay.

Further, when no communication is possible, switching to a path enabling communication is performed to enable communication, such that high reliability can be realized. Furthermore, each device that does not require communication is brought into a standby or power-off state and wireless communication is turned on only when necessary, such that power utilization efficiency can be optimized and low power consumption can be realized.

The control unit 306 of the communication path control device 300 controls either or both of the communication unit included in the master 100 or the communication units 202, 212, 222, and 232 included in the slaves 200, 210, 220, and 230. A communication path can be selected by controlling the communication unit included in the master 100 and the communication units 202, 212, 222, and 232 included in the slaves 200, 210, 220, and 230.

For control of the communication unit of the master 100 and the communication units 202, 212, 222, and 232 of the slaves, the master 100 and the slaves 200, 210, 220, and 230 may include communication control units to control their own communication units. In the example shown in FIG. 7, the slaves 200, 210, 220, and 230 include communication control units 206, 216, 226, and 236. Similarly, the master 100 includes a communication control unit. In this case, the control unit 306 of the communication path control device 300 controls either or both of the communication control unit of the master 100 or the communication control units 206, 216, 226, and 236 of the slaves 200, 210, 220, and 230. Thus, the communication path control device 300 can select a communication path by controlling the communication units of the master 100 and the slaves 200, 210, 220, and 230 via the communication control units.

On the other hand, the control unit 306 of the communication path control device 300 may directly control the communication unit included in the master 100 and the communication units 202, 212, 222, and 232 included in the slaves 200, 210, 220, and 230 without involving the communication control units.

Figure 8:
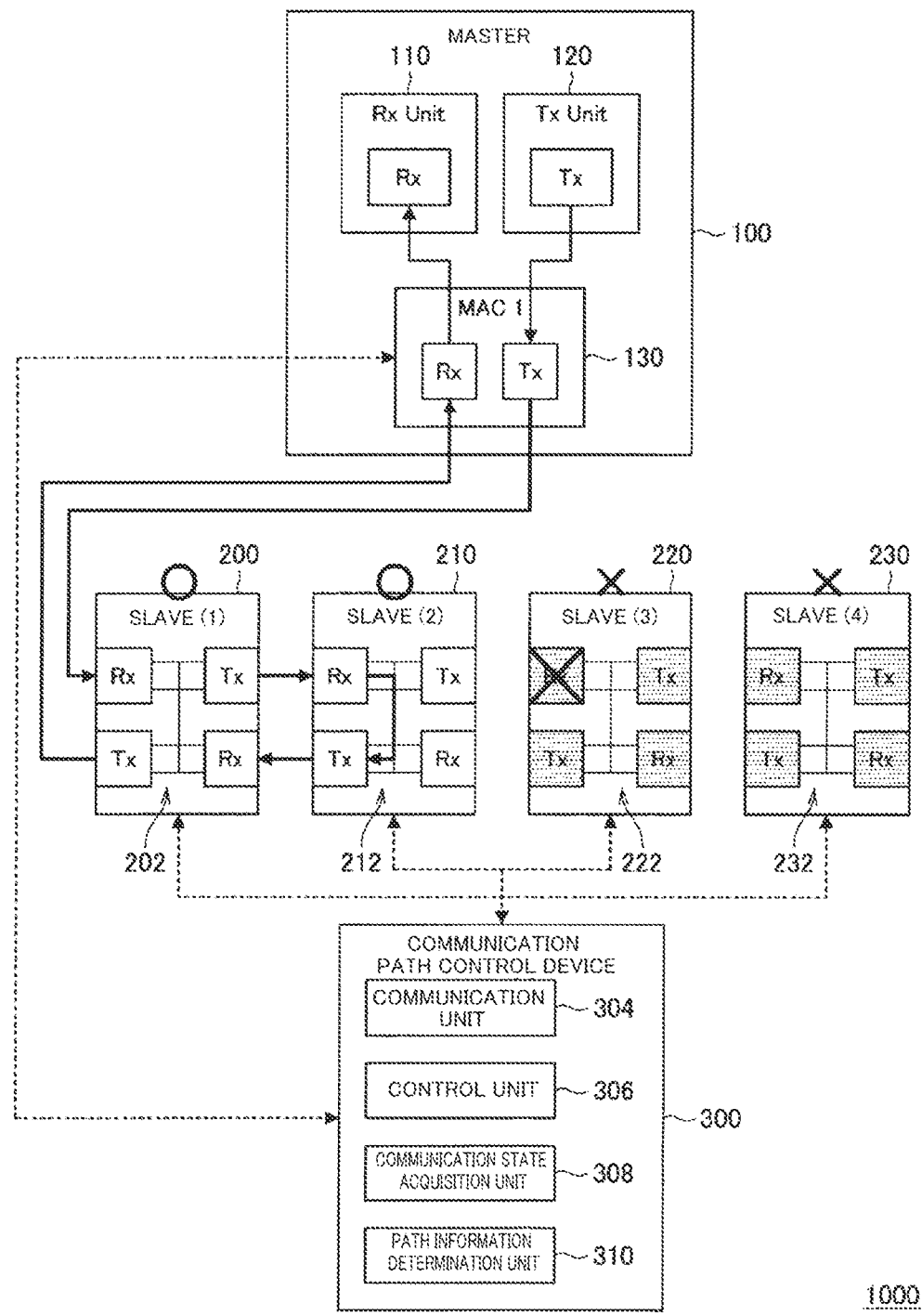
FIG. 8 is a schematic diagram showing a specific example of communication path selection.

3.3. Specific Example of Communication Path Selection
3.3.1. Communication Path Selection in Case of Malfunction FIG. 8 is a schematic diagram showing a specific example of communication path selection. The control unit 306 of the communication path control device 300 controls communication paths by controlling on/off of Ethernet port devices of the communication units 202, 212, 222, and 232 of the slaves 200, 210, 220, and 230. For example, it is possible to prevent the use of paths through which no communication is possible in advance by controlling on/off of the Ethernet port devices.

FIG. 8 is a schematic diagram showing a case where a receiving unit (Rx) for receiving data 10 from the slave (2) 210 malfunctions among the components of the communication unit 222 of the slave (3) 220. Thus, FIG. 8 shows an example in which the communication path control device 300 determines in advance that the receiving unit of the slave (3) 220 has malfunctioned and controls a communication path such that it passes through "master→slave (1)→slave (2)→slave (1)→master". Control is performed to turn off the communication units 222 and 232 of the slave (3) 220 and the slave (4) 230, such that communication from the slave (2) 210 to the slave (3) 220 is not possible and data 10 is transmitted from the slave (2) 210 to the slave (1) 200. At this time, a transmitting unit (Tx) in the slave (2) 210 for transmitting the data 10 to the slave (3) 220 and a receiving unit (Rx) for receiving the data 10 from the slave (3) 220 may be turned off. Determining in advance that communication of the slave (3) 220 is not possible in this way enables efficient communication with lower delay due to a reduced control sequence.

Figure 9:
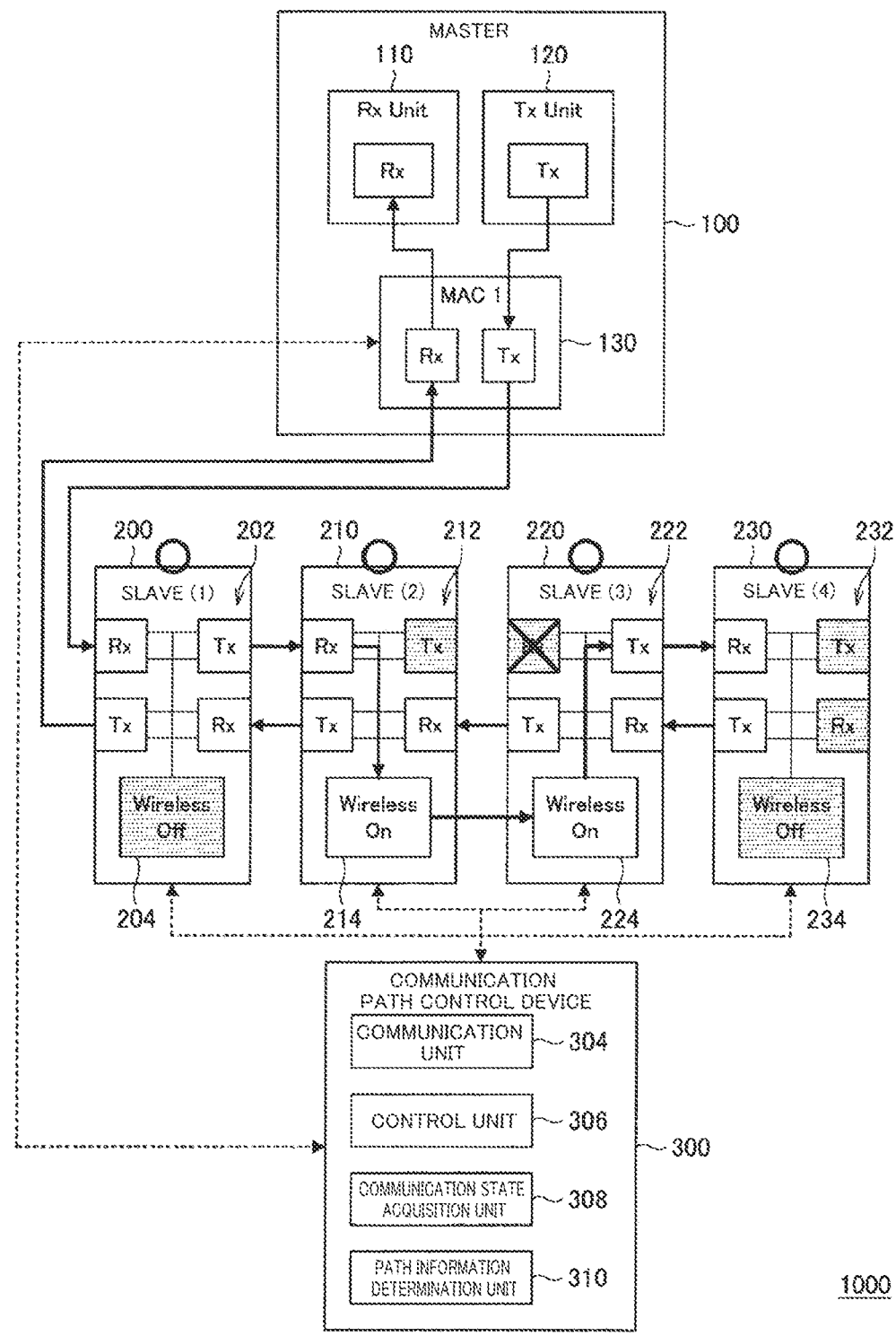
FIG. 9 is a schematic diagram showing a case where data is transmitted using a wireless communication unit.
Figure 10:
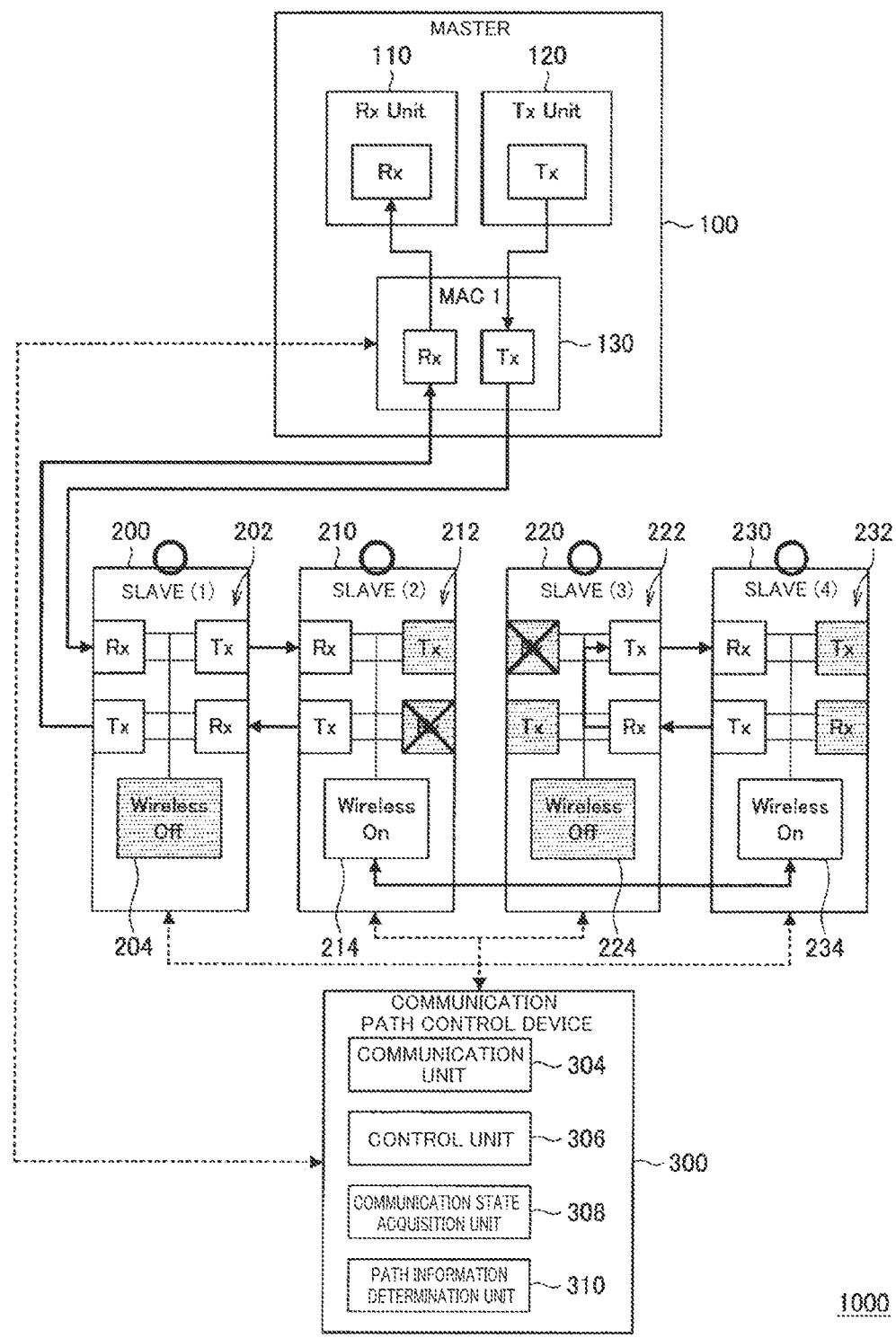
FIG. 10 is a schematic diagram showing a case where data is transmitted using a wireless communication unit.

FIGS. 9 and 10 are schematic views showing cases where data 10 is transmitted using wireless communication units 204, 214, 224, and 234. When the slaves 200, 210, 220, and 230 include the wireless communication units 204, 214, 224, and 234, the communication path control device 300 controls on/off of the wireless communication units 204, 214, 224, and 234 according to a communication path. This enables setting of a communication path using wireless communication paths instead of wired communication paths. At this time, the communication path control device 300 also notifies of wireless communication control information. Examples of wireless communication control information include communication resources, modulation schemes, signal waveforms, coding rates, information on retransmission, transmission weights, and the like. This control information controls wireless communication of the wireless communication units 204, 214, 224, and 234.

Two-way communication or one-way communication can be controlled for wireless communication. FIG. 9 is a schematic diagram showing an example of communication path selection when a part (Rx) of the communication unit 222 of the slave (3) 220 has malfunctioned, in which case one-way communication is performed from the slave (2) 210 to the slave (3) 220. Data 10 is transmitted from the slave (2) 210 to the slave (3) 220 through one-way communication between the wireless communication unit 214 and the wireless communication unit 224. On the other hand, in a path of slave (3) 220→slave (4) 230→slave (3) 220→slave (2) 210, data is transmitted by wire as usual. In the example of FIG. 9, a receiving unit (Rx) for receiving data 10 from the slave (2) 210 malfunctions among the components of the communication unit 222 of the slave (3) 220 as described above and thus only transmission of data 10 for slave (2) 210→slave (3) 220 is replaced with that through a wireless communication path.

FIG. 10 is a schematic diagram showing an example of communication path selection when a part of the communication unit 212 of the slave (2) 210 and a part of the communication unit 222 of the slave (3) 220 have malfunctioned, in which case two-way communication is performed between the slave (2) 210 and the slave (4) 230. Data is transmitted between the slave (2) 210 and the slave (4) 230 through two-way communication between the wireless communication unit 214 and the wireless communication unit 234. Data is transmitted by wire between the slave (4) 230 and the slave (3) 220. In the example of FIG. 10, a receiving unit (Rx) for receiving data 10 from the slave (3) 220 malfunctions among the components of the wireless communication unit 214 of the slave (2) 210 and a receiving unit (Rx) for receiving data 10 from the slave (2) 210 malfunctions among the components of the communication unit 222 of the slave (3) 220. Thus, the slave (3) 220 is temporarily bypassed and data 10 is transmitted in the order of slave (2) 210→slave (4) 230→slave (3) 220. The data 10 turns around at the slave (3) 220 and returns to the master 100 in the order of slave (3) 220→slave (4) 230→slave (2) 210→slave (1) 200.

Figure 11:
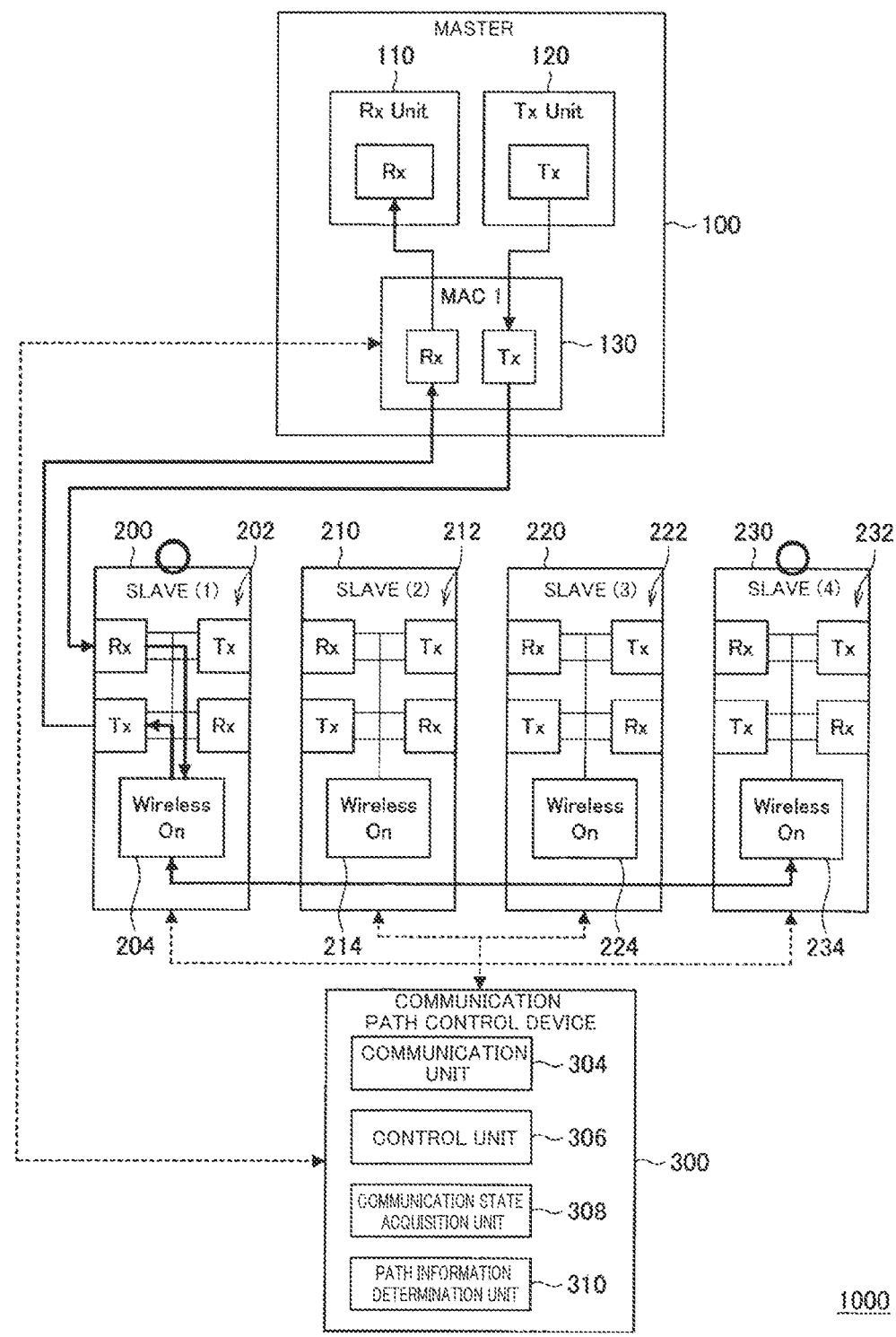
FIG. 11 is a schematic diagram showing an example of selecting a communication path according to the presence or absence of data addressed to each slave.

3.3.2. Communication Path Selection According to Presence or Absence of Data Addressed to Slave FIG. 11 is a schematic diagram showing an example of selecting a communication path according to the presence or absence of data addressed to each slave. When data sent from the master 100 includes data addressed only to the slave (1) 200 and the slave (4) 230, data is transmitted using two-way wireless communication between the wireless communication unit 204 of the slave (1) 200 and the wireless communication unit 234 of the slave (4) 230. Data 10 is wirelessly transmitted from the slave (1) 200 to the slave (4) 230, turns around at the slave (4) 230, is transmitted from the slave (4) 230 to the slave (1) 200 through wireless communication, and returns to the master 100. Data transmission to the slave (2) 210 and the slave (3) 220 is omitted, such that the bandwidth can be reduced and low delay can be achieved. The modules of the wireless communication units 214 and 224 of the slave (2) 210 and the slave (3) 220 that do not communicate may be left on or may be turned off or brought into a standby state.

3.3.3. Example of Selecting Communication Path According to Type of Information

For example, wired communication is used for high-priority information that requires safety and security and wireless communication is used for other low-priority information or information that allows for operation even if dropped. Examples of high-priority information include information on an emergency stop of a robot and feedback signals in motor control or the like. Examples in the case of a flight terminal such as a drone include information obtained from an acceleration sensor.

Examples of low-priority information (information that allows for operation even if dropped) include information whose value does not change instantly (information whose notification cycle may be delayed) and information that can be complemented by other values. For example, temperature information or weather information corresponds to information whose value does not change instantly. Examples of information that can be complemented by other values include detection values of a torque sensor and an acceleration sensor.

3.3.4. Example of Selecting Path with Small Amount of Delay

For example, it is assumed that there are slaves (1) to (100) which are sequentially arranged from the base to the tip of an arm of a robot. In this case, if the slave (50) is out of operation, data 10 is transmitted from the master 100 to the slave (1) and also transmitted from the master 100 to the slave (51) through a wireless communication path. The transmission of the data 10 from the master 100 to the slave (1) may be either wired or wireless. This allows the data to be transmitted from the slave (1) to the slave (49) and from the slave (51) to the slave (100) in parallel. Thus, the data can be transmitted to the slave (100) at the tip with lower delay.

Further, for example, when there are slaves (1) to (100) among which the slaves (1), (25), (50), (75), and (100) each have a wireless communication unit, the master 100 transmits data to each of the slaves (25), (50), (75), and (100) through a wireless communication path. The transmission of the data 10 from the master 100 to the slave (1) may be either wired or wireless. The data 10 transmitted to the slave (1) is sequentially transmitted from the slave (1) to the slave (24) by wire. Similarly, the data transmitted to the slave (25) through a wireless communication path is sequentially transmitted from the slave (25) to the slave (49) by wire, and the data transmitted to the slave (50) through a wireless communication path is sequentially transmitted from the slave (50) to the slave (74) by wire. Similarly, the data transmitted to the slave (75) through a wireless communication path is sequentially transmitted from the slave (75) to the slave (99) by wire. These data transmissions are performed in parallel, such that low delay can be realized.

3.3.5. Example of Selection According to Communication Directions in which Wired Communication/Wireless Communication is Possible For example, if a communication unit of a slave is out of operation in the case of two-way communication, transmission and reception will not be possible and thus it is necessary to select a path such as not using a corresponding communication path. On the other hand, in the case of one-way communication, it is conceivable that no transmission is possible while reception is possible and thus communication path selection is performed taking into consideration that reception is possible. Examples of one-way communication include serial peripheral interface (SPI) and universal asynchronous receiver/transmitter (UART).

3.3.6. Example of Selecting Path Limited to Terminal that Requires Communication For example, it is assumed that there are a master 100 and slaves (1) 200 to (4) 230, the slaves (1) to (4) do not all have a wireless communication device, and data transmission is required for the slave (4) 230 at the distal end. In this case, data may be transmitted wirelessly up to a slave closest to the master 100 among the slaves having a wireless communication device and may be transmitted by wire from the closest slave to the slave (4) 230 at the tip. Assuming an arm of a robot, this can be applied, for example, to cases such as where the slave (4) corresponds to a hand at the tip of the arm and the lid of a bottle is opened or closed by the hand. Such path selection is possible in those cases because it is only necessary to move the tip (the slave (4)).

Slaves that do not operate may be brought into a standby state in which they do not operate at all or may feed information necessary for control such as joint angle information back to the master 100.

3.3.7. Example of Notifying Communication Path Control Device of Information Relating to Communication Unit The master 100 and the slaves 200, 210, 220, and 230 notify the communication path control device 300 in advance of the states of communication units included in the master 100 and the slaves 200, 210, 220, and 230 or information relating to control of the communication units. This allows the communication path control device 300 to predict a situation where communication will not be possible in advance and to acquire information indicating whether the master 100 and slaves 200, 210, 220, and 230 are currently able to communicate.

Performing path selection based on this information can realize low delay, high reliability, low power consumption, and the like. Specifically, it is possible to reduce communication errors and the number of steps of processing communication errors by avoiding an unexpected situation where no communication is possible in advance. This can realize low delay.

In addition, high reliability can be realized by predicting a situation where communication will not be possible or monitoring the current communication state to always maintain a state in which communication is possible. In addition, the slaves 200, 210, 220, and 230 which do not require communication or are likely to be unable to communicate are brought into a standby or power-off state and wireless communication is turned on only when necessary, such that power utilization efficiency can be optimized and low power consumption can be realized.

Either or both of the master 100 and the slaves 200, 210, 220, and 230 include a notification unit that notifies the communication path control device 300 of the states of communication units included in the master 100 and the slaves 200, 210, 220, and 230 or information relating to control of the communication units. The master 100 and the slaves 200, 210, 220, and 230 notify the communication path control device 300 whether all functions of the communication units included in the master 100 and the slaves 200, 210, 220, and 230 are operating normally or malfunctioning. The information to be notified includes not only the states of the communication units but also the states of the communication control units that control the communication units. The communication state acquisition unit 308 of the communication path control device 300 acquires the communication states from the information of which the master 100 and the slaves 200, 210, 220, and 230 have notified. The path information determination unit 310 of the communication path control device 300 determines path information that determines communication paths between the master 100 and the slaves 200, 210, 220, and 230. At this time, the path information determination unit 310 can determine the path information based on the communication states acquired from the master 100 and the slaves 200, 210, 220, and 230. The control unit 306 transmits the path information to the master 100 and the slaves 200, 210, 220, and 230 through the communication unit 304 and controls the communication units of the master 100 and the slaves 200, 210, 220, and 230 based on the path information. Path information may be included in the data 10, for example, when the communication path control device 300 is included in the master 100 as shown in FIG. 6. In this case, for example, path information is included in a header of the data 10 as metadata. This allows the slaves 200, 210, 220, and 230 to control the path based on the path information included in the forwarded data 10.

When the master 100 and the slaves 200, 210, 220, and 230 are malfunctioning, the master 100 and the slave 200, 210, 220, and 230 notify the communication path control device 300 of which functions are operating or not operating. The information to be notified includes, for example, not only information on malfunctions but also information such as that regarding abnormal insertion into an Ethernet port of a communication unit (a contact failure). In this case, the master 100 and the slaves 200, 210, 220, and 230 notify the communication path control device 300 that a wired cable has been disconnected from the Ethernet port.

3.3.8. Example of Notifying of Time Information Such as Transmission and Reception Times In this example, detection is performed using a timer according to the number of slaves connected behind an arbitrary slave (X). For example, if data 10 is not returned from a slave connected behind the slave (X) within the time of a timer assumed according to the number of slaves connected behind the slave (X), the slave (X) returns the data 10 to the master 100 without waiting for the returned data 10 and further notifies the master 100 that the data has not been returned within the time. The master 100 notifies each slave of a value of the timer according to a requested delay.

For example, in the example of FIG. 5, the master 100 notifies the slave (1) 200 of a value of the timer corresponding to the number of slaves "3" because the number of slaves connected behind the slave (1) 200 is 3. If the data 10 is not returned from the slave (2) 210 within the time of the timer, the slave (1) 200 notifies the master 100 of this fact.

3.3.9. Control According to State of Wireless Communication Path

In this example, the distance or the channel states between the wireless communication units of the master or the slaves, absolute position information of the wireless communication units, relative position information between the master and the slaves, angle information of these devices, 3D model information of the devices, and the like are measured or acquired in advance and held in the corresponding devices or notified to other devices or are measured by the communication path control device.

Using such information in the calculation of communication path selection can provide communication with lower delay. Assuming application to a robot, such information may be, for example, information indicating the posture of the robot. For example, the distance between wireless communication devices is usually long, but may be short depending on the situation. In this case, wireless communication is used as a communication path. In an example, assuming a robot, it is conceivable that both hands of the robot are usually separated from each other and thus using wired communication allows for communication with lower delay. On the other hand, for example, when holding an object with both hands, the distance between both hands becomes short and thus the path is switched to wireless communication.

It is also conceivable that wired communication cannot be used, for example, depending on the states of the master and slaves. In this case, switching to wireless communication is performed. In an example, assuming application to a robot, a situation is conceivable such as where a cable for wired communication is pressed by the posture of the robot and no communication is possible. In this case, switching to wireless communication is performed.

3.3.10. When Wireless Communication Unit Malfunctions

Figure 12:
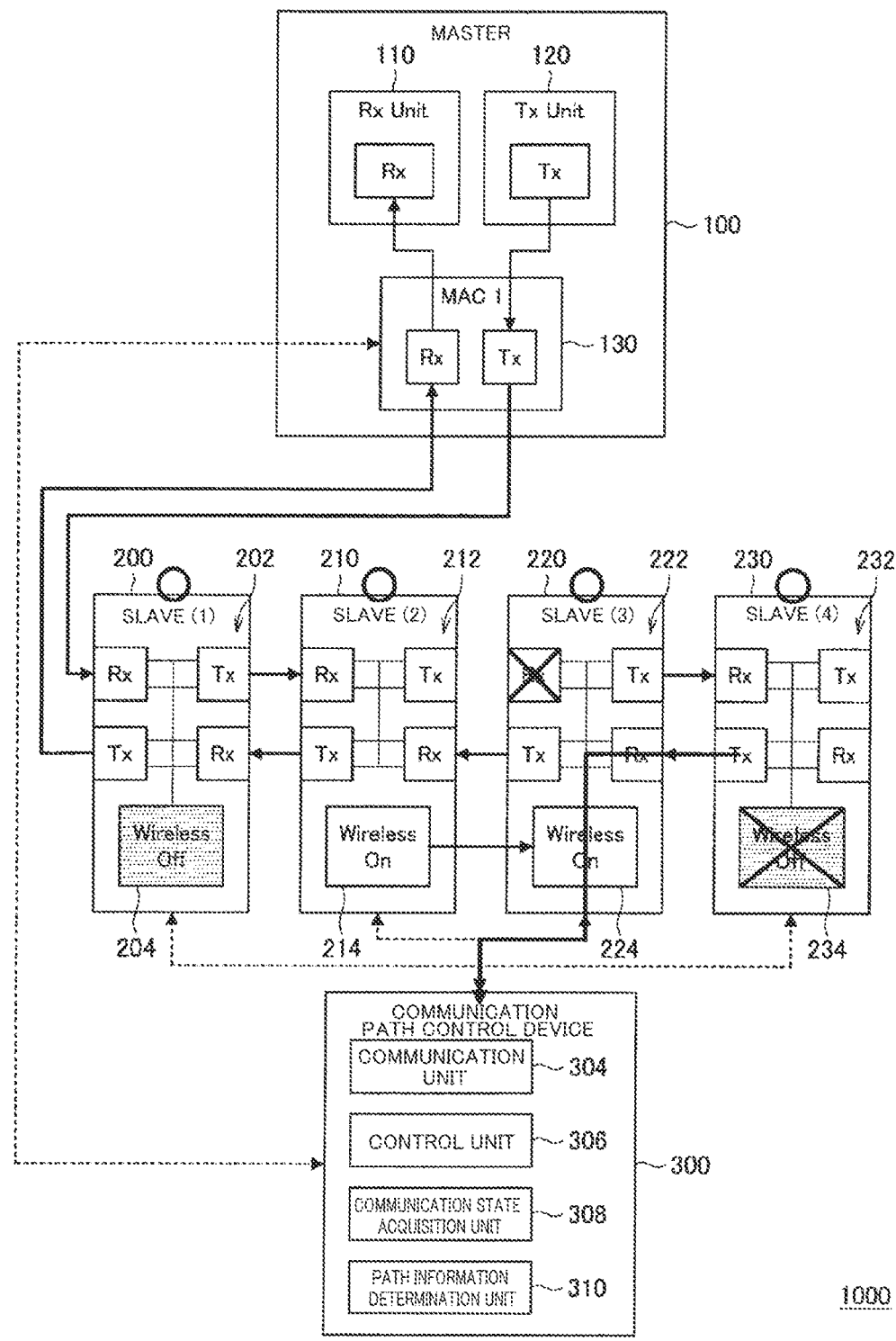
FIG. 12 is a schematic diagram showing an example of a case where a communication path between a slave (4) and a communication path control device is unusable and therefore the slave (4) notifies the communication path control device via a slave (3).

When the function of the wireless communication unit 104, 204, 214, 224, or 234 that communicates with the communication path control device 300 is not operating, the master 100 or the slave 200, 210, 220, or 230 may communicate with the communication path control device 300 via a communication unit of another device. FIG. 12 is a schematic diagram showing an example of a case where the wireless communication unit 234 of the slave (4) 230 malfunctions such that the communication path between the slave (4) 230 and the communication path control device 300 is unusable and therefore the slave (4) 230 notifies the communication path control device 300 via the slave (3) 220.

Default path information notified in advance is used if the wireless communication unit 234 of the slave (4) 230 malfunctions as shown in FIG. 12. The communication path control device 300 notifies the master 100 and the slaves 200, 210, 220, and 230 of default path information at the start of communication or periodically.

3.3.11. Example of Sequence According to Present Embodiment

Figure 13:
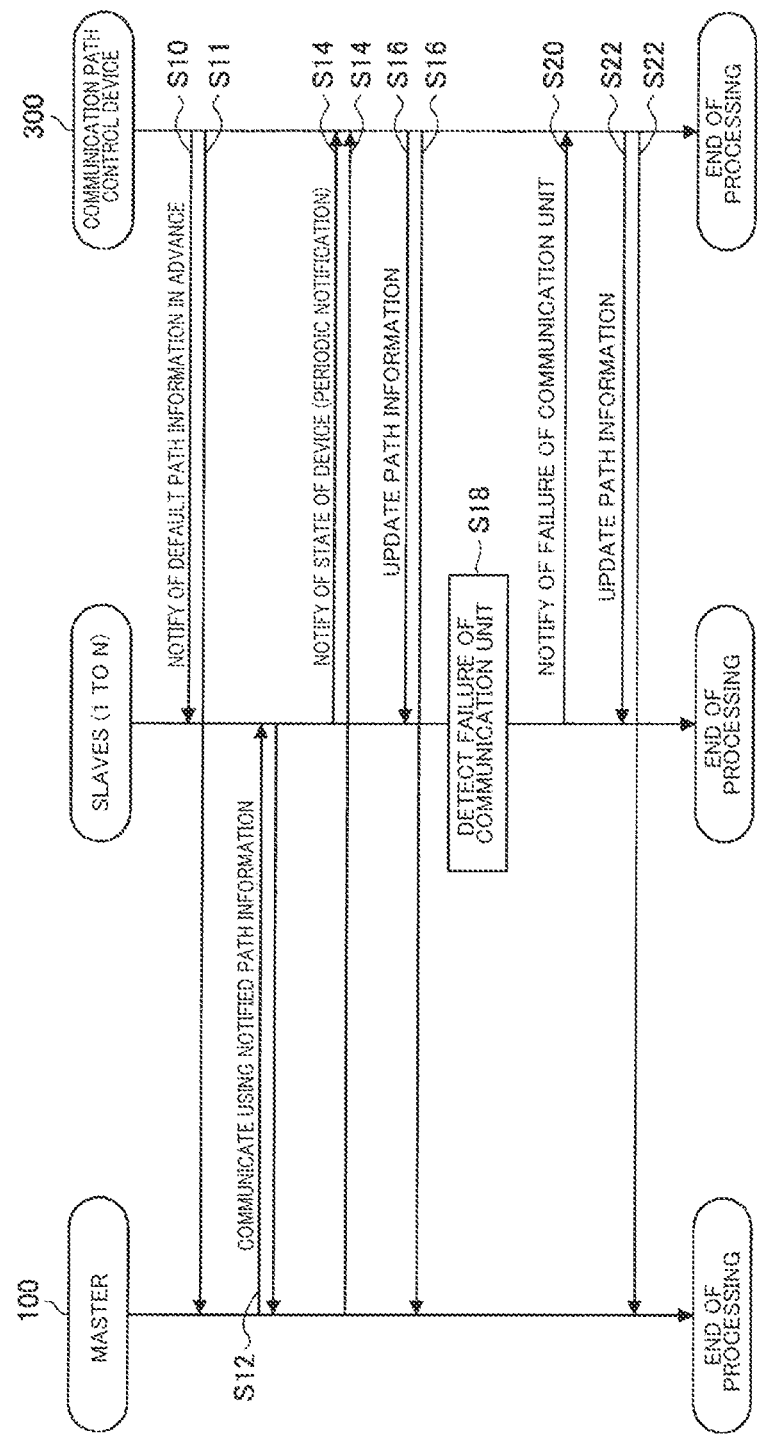
FIG. 13 is a sequence diagram showing an example of a sequence.

FIG. 13 is a sequence diagram showing an example of a sequence. The sequence is not limited to this example. First, in steps S10 and S11, the communication path control device 300 notifies the master 100 and slaves 1 to N of default path information in advance. The default path information is communication path information that is used, for example, at the time of initial operation, when the communication path control device 300 stops operating due to a failure or the like, or when the terminal is reset.

Next, in step S12, the master 100 transmits data using path information of which the communication path control device 300 has notified and the slaves 1 to N receive the data.

Next, in step S14, the master 100 and the slaves 1 to N notify the communication path control device 300 of information regarding communication path selection (states of the devices). Although the states of the devices are notified in this example, the states of the devices are an example and other information may be notified. It is conceivable that an example of this notification is, for example, but not limited to, notification that is performed periodically. The master and the slaves do not need to perform notification at the same time and may perform notification at timings individually set for the master and the slaves.

Next, in step S16, the communication path control device 300 updates path information based on the information regarding communication path selection of which the master 100 and the slaves 1 to N have notified. It is unnecessary to perform notification if there is no update in the path information.

Next, in step S18, one of the slaves detects a failure of its own communication unit. Here, it is assumed that slave n has detected a failure of the communication unit.

Next, in step S20, the slave n notifies the communication path control device 300 of the failure of the communication unit. The communication path control device 300 that has received the notification determines path information according to the failure.

Next, in step S22, the communication path control device 300 notifies the master and slaves 1 to N of the updated path information.

According to the present embodiment, it is possible to apply an optimal communication path for the states of the master 100 and the slaves 200, 210, 220, and 230 in the system 1000 in which data 10 is forwarded between the master 100 and the slaves 200, 210, 220, and 230 as described above. This enables communication to be performed between communication devices with lower delay, higher reliability, and lower power consumption.

Although preferred embodiments of the present disclosure have been described in detail with reference to the accompanying drawings, the technical scope of the present disclosure is not limited to such examples. It is apparent that a person with ordinary knowledge in the technical field of the present disclosure can come up with various changes or modifications within the scope of the technical idea described in the claims. Of course, it is to be understood that the changes or modifications also fall within the technical scope of the present disclosure.

Further, the advantages described in the present specification are merely illustrative or exemplary, and not limiting. That is, the technology according to the present disclosure can achieve other advantages that are apparent to those skilled in the art from the description of the present specification, together with or instead of the above advantages.

The following configurations also fall within the technical scope of the present disclosure.

(1)

A communication path control device configured to transmit path information for controlling a path for transmitting data to a plurality of communication devices which are connected by a wired path and through which data addressed to the plurality of communication devices is sequentially forwarded.

(2)

The communication path control device according to the above (1), wherein the plurality of communication devices are connected in series by the wired path, and the data is sequentially forwarded from a specific communication device configured to function as a master to other ones of the communication devices, turns around at the communication device located at a distal end, and returns to the specific communication device.

(3)

The communication path control device according to the above (1) or (2), wherein at least a part of the plurality of communication devices includes wireless communication units configured to perform wireless communication therebetween, and the path information includes information for switching communication between the communication devices from the wired path to a wireless path via the wireless communication unit.

(4)

The communication path control device according to the above (3), wherein the path information includes information for switching communication between the communication devices from the wired path to a wireless path via the wireless communication unit when the wired path has malfunctioned.

(5)

The communication path control device according to the above (3), which transmits control information for the wireless communication to the communication device including the wireless communication unit.

(6)

The communication path control device according to the above (5), wherein the control information includes information on at least one of a communication resource, a modulation scheme, a signal waveform, a coding rate, data retransmission, and a transmission weight.

(7)

The communication path control device according to any one of the above (1) to (6), wherein the path information includes information for controlling a communication unit configured to allow the plurality of communication devices to communicate with each other.

(8)

The communication path control device according to any one of the above (1) to (7), configured to transmit the path information to the plurality of the communication devices wirelessly or by wire.

(9)

The communication path control device according to any one of the above (1) to (8), which is included in a specific communication device configured to function as a master among the plurality of communication devices.

(10)

The communication path control device according to the above (1), wherein at least a part of the plurality of communication devices includes wireless communication units configured to perform wireless communication therebetween, and the path information includes information for applying a wireless path via the wireless communication unit for forwarding the data from a specific communication device configured to function as a master to the communication device to which the data is addressed.

(11)

The communication path control device according to the above (1), wherein at least a part of the plurality of communication devices includes wireless communication units configured to perform wireless communication therebetween, and the path information includes information for transmitting data from a specific communication device configured to function as a master to a part of the plurality of communication devices and transmitting the data from the part of the plurality of communication devices via the wired path in parallel.

(12)

The communication path control device according to the above (1), wherein at least a part of the plurality of communication devices includes wireless communication units configured to perform wireless communication therebetween, and the path information includes information for transmitting the data using the wired path for high-priority information and using the wireless communication path for low-priority information.

(13)

The communication path control device according to the above (1), wherein the path information is determined according to an amount of delay in data transmission or a transmission direction.

(14)

The communication path control device according to the above (1), further including a communication state acquisition unit configured to acquire a communication state of the plurality of communication devices, and a path information determination unit configured to determine the path information according to the communication state.

(15)

A communication path control method including transmitting path information for controlling a path for transmitting data to a plurality of communication devices which are connected by a wired path and through which data addressed to the plurality of communication devices is sequentially forwarded.

(16)

A communication path control system including a plurality of communication devices which are connected by a wired path and through which data is sequentially forwarded, and a communication path control device configured to transmit path information for controlling a path for transmitting the data to the communication devices.

REFERENCE SIGNS LIST

100 Master
200, 210, 220, 230 Slave
202, 212, 222, 232 Communication unit
204, 214, 224, 234 Wireless communication unit
300 Communication path control device
304 Communication unit
306 Control unit
308 Communication state acquisition unit
310 Path information determination unit

The invention claimed is:

1. A communication path control device, comprising:
circuitry configured to:
receive a notification that indicates a failure of a first communication unit of a first communication device of a plurality of communication devices;
determine path information, based on the failure of the first communication unit and an amount of delay in first transmission of data from a specific communication device to the plurality of communication devices, wherein
the specific communication device functions as a master to the plurality of communication devices,
the plurality of communication devices is connected by at least one of a wired path or a wireless path,
the path information is for control of a path for the first transmission of the data to the plurality of communication devices,
the path information includes first information for
the first transmission of the data from the specific communication device to a second communication device of the plurality of communication devices and a third communication device of the plurality of communication devices,
second transmission of the data from the second communication device to a fourth communication device of the plurality of communication devices through the wired path, and
third transmission of the data from the third communication device to a fifth communication device of the plurality of communication devices through the wired path in parallel with the second transmission of the data, and
the data addressed to the plurality of communication devices is sequentially forwarded through one of the wired path or the wireless path; and
transmit the path information to the plurality of communication devices through one of the wired path or the wireless path.

2. The communication path control device according to claim 1, wherein
the plurality of communication devices is connected in series by the wired path,
the data is sequentially forwarded from the specific communication device that functions as the master to the plurality of communication devices, and
the data turns around at the fifth communication device located at a distal end, and returns to the specific communication device.

3. The communication path control device according to claim 1, wherein
each communication device of a set of communication devices of the plurality of communication devices includes a wireless communication unit that performs wireless communication between the set of communication devices, and
the path information further includes second information to switch communication between the set of communication devices from the wired path to the wireless path via the wireless communication unit.

4. The communication path control device according to claim 3, wherein
the circuitry is further configured to determine the wired path has malfunctioned, and
the path information includes the second information to switch the communication between the set of communication devices from the wired path to the wireless path based on the determination the wired path has malfunctioned.

5. The communication path control device according to claim 3, wherein the circuitry is further configured to transmit control information for the wireless communication to the set of communication devices.

6. The communication path control device according to claim 5, wherein the control information includes information on at least one of a communication resource, a modulation scheme, a signal waveform, a coding rate, data retransmission, or a transmission weight.

7. The communication path control device according to claim 1, wherein the path information further includes second information for control of a second communication unit that performs communication between the plurality of communication devices.

8. The communication path control device according to claim 1, wherein the communication path control device is in the specific communication device that functions as the master to the plurality of communication devices.

9. The communication path control device according to claim 1, wherein
each communication device of a set of communication devices of the plurality of communication devices includes a wireless communication unit that performs wireless communication between the set of communication devices, and
the path information further includes second information for the wireless path via the wireless communication unit to forward the data from the specific communication device to the set of communication devices to which the data is addressed.

10. The communication path control device according to claim 1, wherein
each communication device of a set of communication devices of the plurality of communication devices includes a wireless communication unit that performs wireless communication between the set of communication devices, and
the set of communication devices includes the first communication device, the second communication device, the third communication device, the fourth communication device, and the fifth communication device.

11. The communication path control device according to claim 1, wherein
each communication device of a set of communication devices of the plurality of communication devices includes a wireless communication unit that performs wireless communication between the set of communication devices, and
the path information further includes second information for the first transmission of the data through the wired path for high-priority information and through the wireless path for low-priority information.

12. The communication path control device according to claim 1, wherein the circuitry is further configured to determine the path information based on a transmission direction that corresponds to one of a one-way communication or a two-way communication.

13. The communication path control device according to claim 1, wherein the circuitry is further configured to:
acquire a communication state of the plurality of communication devices; and
determine the path information based on the acquired communication state.

14. A communication path control method, comprising:
receiving a notification that indicates a failure of a communication unit of a first communication device of a plurality of communication devices;
determining path information, based on the failure of the communication unit and an amount of delay in first transmission of data from a specific communication device to the plurality of communication devices, wherein
the specific communication device functions as a master to the plurality of communication devices,
the plurality of communication devices is connected by at least one of a wired path or a wireless path,
the path information is for control of a path for the first transmission of the data to the plurality of communication devices,
the path information includes information for
the first transmission of the data from the specific communication device to a second communication device of the plurality of communication devices and a third communication device of the plurality of communication devices,
second transmission of the data from the second communication device to a fourth communication device of the plurality of communication devices through the wired path, and
third transmission of the data from the third communication device to a fifth communication device of the plurality of communication devices through the wired path in parallel with the second transmission of the data, and
the data addressed to the plurality of communication devices is sequentially forwarded through one of the wired path or the wireless path; and
transmitting the path information to the plurality of communication devices through one of the wired path or the wireless path.

15. A communication path control system, comprising:
a plurality of communication devices, wherein
the plurality of communication devices is connected by at least one of a wired path or a wireless path, and
data addressed to the plurality of communication devices is sequentially forwarded through one of the wired path or the wireless path; and
circuitry configured to:
receive a notification that indicates a failure of a communication unit of a first communication device of the plurality of communication devices;
determine path information, based on the failure of the communication unit and an amount of delay in first transmission of the data from a specific communication device to the plurality of communication devices, wherein
the specific communication device functions as a master to the plurality of communication devices,
the path information is for control of a path for the first transmission of the data to the plurality of communication devices,
the path information includes information for
the first transmission of the data from the specific communication device to a second communication device of the plurality of communication devices and a third communication device of the plurality of communication devices,
second transmission of the data from the second communication device to a fourth communication device of the plurality of communication devices through the wired path, and third transmission of the data from the third communication device to a fifth communication device of the plurality of communication devices through the wired path in parallel with the second transmission of the data; and
transmit the path information to the plurality of communication devices through one of the wired path or the wireless path.

* * * * *